(12) United States Patent
Prenter et al.

(10) Patent No.: US 11,808,178 B2
(45) Date of Patent: Nov. 7, 2023

(54) TANGENTIAL ONBOARD INJECTOR INLET EXTENDER

(71) Applicant: RTX Corporation, Farmington, CT (US)

(72) Inventors: Robin Prenter, Avon, CT (US); Ricardo Trindade, Mansfield, CT (US); Ryan Lundgreen, Granby, CT (US)

(73) Assignee: RTX CORPORATION, Farmington, CT (US)

( * ) Notice: Subject to any disclaimer, the term of this patent is extended or adjusted under 35 U.S.C. 154(b) by 521 days.

(21) Appl. No.: 16/531,430

(22) Filed: Aug. 5, 2019

(65) Prior Publication Data

US 2021/0054753 A1 Feb. 25, 2021

(51) Int. Cl.
*F01D 9/06* (2006.01)
*F01D 5/08* (2006.01)
*F02C 7/18* (2006.01)
*F23R 3/02* (2006.01)

(52) U.S. Cl.
CPC ............. *F01D 9/065* (2013.01); *F01D 5/081* (2013.01); *F02C 7/18* (2013.01); *F23R 3/02* (2013.01); *F05D 2240/12* (2013.01)

(58) Field of Classification Search
CPC ................................................ F01D 5/08–088
See application file for complete search history.

(56) References Cited

U.S. PATENT DOCUMENTS

| | | | | |
|---|---|---|---|---|
| 3,826,084 A | * | 7/1974 | Branstrom | F01D 5/081 415/115 |
| 4,291,531 A | * | 9/1981 | Campbell | F02C 7/18 60/39.511 |
| 4,807,433 A | * | 2/1989 | Maclin | F01D 5/081 415/115 |
| 5,154,048 A | * | 10/1992 | Ponziani | F01D 5/08 60/792 |
| 5,402,636 A | | 4/1995 | Mize et al. | |

(Continued)

FOREIGN PATENT DOCUMENTS

| | | | | |
|---|---|---|---|---|
| EP | 3048250 A1 | | 7/2016 | |
| GB | 2084654 A | * | 4/1982 | F02C 7/18 |

OTHER PUBLICATIONS

The Extended European Search Report for Application No. 20189698.2-1004; Report dated Oct. 27, 2020; Report Received Date: Nov. 10, 2020; 6 pages.

(Continued)

*Primary Examiner* — Todd E Manahan
*Assistant Examiner* — Marc J Amar
(74) *Attorney, Agent, or Firm* — CANTOR COLBURN LLP

(57) ABSTRACT

A diffuser case for a gas turbine engine including: a pre-diffuser; a diffuser case defining a dump region, an inner plenum, and an outer plenum, the pre-diffuser being fluidly connected to the inner plenum and the outer plenum through the dump region; a tangential onboard injector module fluidly connected to the inner plenum through inlet orifice located in the diffuser case proximate an aft end of the inner plenum; and an inlet extender initiating at the inlet orifice of the tangential onboard injector module, extends through the inner plenum, and terminates at a distal end proximate the pre-diffuser.

18 Claims, 5 Drawing Sheets

(56) References Cited

U.S. PATENT DOCUMENTS

| | | | | |
|---|---|---|---|---|
| 5,983,642 | A * | 11/1999 | Parker | F23R 3/286 |
| | | | | 60/737 |
| 7,000,404 | B2 * | 2/2006 | Palmisano | F01D 25/12 |
| | | | | 60/782 |
| 7,465,148 | B2 | 12/2008 | Klinger | |
| 9,945,248 | B2 | 4/2018 | Mccaffrey | |
| 10,227,927 | B2 | 3/2019 | Spangler et al. | |
| 2005/0268619 | A1 * | 12/2005 | Ress | F01D 5/3015 |
| | | | | 60/782 |
| 2010/0257869 | A1 * | 10/2010 | Cornelius | F23R 3/005 |
| | | | | 60/782 |
| 2012/0060507 | A1 | 3/2012 | King et al. | |
| 2016/0017755 | A1 * | 1/2016 | Low | F02C 3/04 |
| | | | | 60/805 |
| 2016/0131037 | A1 * | 5/2016 | Spangler | F01D 5/085 |
| | | | | 60/806 |
| 2016/0186661 | A1 * | 6/2016 | Smith | F23R 3/005 |
| | | | | 60/728 |
| 2018/0291744 | A1 | 10/2018 | Devore et al. | |

OTHER PUBLICATIONS

European Office Action for European Application No. 20189698.2 dated May 10, 2022, 5 Pages.
Communication pursuant to Article 94(3) EPC dated Mar. 6, 2023; EP Application No. 20189698.2; 5 pages.

* cited by examiner

US 11,808,178 B2

TANGENTIAL ONBOARD INJECTOR INLET EXTENDER

BACKGROUND

The subject matter disclosed herein generally relates to gas turbine engines and, more particularly, to an apparatus for mitigating entry or particulate into a tangential onboard injector (TOBI) module of gas turbine engines.

In one example, a combustor of a gas turbine engine may be configured to burn fuel in a combustion area. Such configurations may place substantial heat load on the structure of the combustor (e.g., heat shield panels, shells, etc.). Such heat loads may dictate that special consideration is given to structures, which may be configured as heat shields or panels, and to the cooling of such structures to protect these structures. Excess temperatures at these structures may lead to oxidation, cracking, and high thermal stresses of the heat shields panels.

SUMMARY

According to an embodiment, a diffuser case for a gas turbine engine is provided. The diffuser case including: a pre-diffuser; a diffuser case defining a dump region, an inner plenum, and an outer plenum, the pre-diffuser being fluidly connected to the inner plenum and the outer plenum through the dump region; a tangential onboard injector module fluidly connected to the inner plenum through inlet orifice located in the diffuser case proximate an aft end of the inner plenum; and an inlet extender initiating at the inlet orifice of the tangential onboard injector module, extends through the inner plenum, and terminates at a distal end proximate the pre-diffuser.

In addition to one or more of the features described above, or as an alternative, further embodiments may include a radially inward wall at least partially defining the inner plenum, wherein the inlet extender is located proximate the radially inward wall.

In addition to one or more of the features described above, or as an alternative, further embodiments may include that the inlet extender fluidly separates the inner plenum into a first inner plenum and a second inner plenum, wherein the inlet orifice is fluidly connected to the first inner plenum.

In addition to one or more of the features described above, or as an alternative, further embodiments may include that the pre-diffuser includes a guide wall defining the pre-diffuser. The inlet extender proximate the distal end is shaped to be about perpendicular to the guide wall of the pre-diffuser.

In addition to one or more of the features described above, or as an alternative, further embodiments may include that the pre-diffuser includes a guide wall defining the pre-diffuser. An angle between the guide wall of the pre-diffuser and the inlet extender proximate the distal end is less than or equal to 90 degrees.

In addition to one or more of the features described above, or as an alternative, further embodiments may include that the pre-diffuser includes a guide wall defining the pre-diffuser. An angle between the guide wall of the pre-diffuser and the inlet extender proximate the distal end is less than 90 degrees.

In addition to one or more of the features described above, or as an alternative, further embodiments may include that the pre-diffuser includes a guide wall defining the pre-diffuser. An angle between the guide wall of the pre-diffuser and the inlet extender proximate the distal end is equal to 90 degrees.

In addition to one or more of the features described above, or as an alternative, further embodiments may include: an orifice located in the inlet extender fluidly connecting the first inner plenum and the second inner plenum; and a ramp located opposite the orifice.

In addition to one or more of the features described above, or as an alternative, further embodiments may include a radially inward wall at least partially defining the inner plenum, wherein the inlet extender is located proximate the radially inward wall. The ramp extends away from the radially inward wall and towards the orifice.

In addition to one or more of the features described above, or as an alternative, further embodiments may include a radially inward wall at least partially defining the inner plenum, wherein the inlet extender is located proximate the radially inward wall. The ramp is orientated at an angle relative to the radially inward wall, the angle being less than 90 degrees as measured between the radially inward wall and an aft side of the ramp.

According to an embodiment, a gas turbine engine is provided. The gas turbine engine including: a pre-diffuser; a diffuser case defining a dump region, an inner plenum, and an outer plenum, the pre-diffuser being fluidly connected to the inner plenum and the outer plenum through the dump region; a combustor housed within the diffuser case between the inner plenum and the outer plenum; a tangential onboard injector module fluidly connected to the inner plenum through inlet orifice located in the diffuser case proximate an aft end of the inner plenum; and an inlet extender initiating at the inlet orifice of the tangential onboard injector module, extends through the inner plenum, and terminates at a distal end proximate the pre-diffuser.

In addition to one or more of the features described above, or as an alternative, further embodiments may include that the inlet extender is interposed between the combustor and a radially inward wall of the diffuser case.

In addition to one or more of the features described above, or as an alternative, further embodiments may include that the inlet extender fluidly separates the inner plenum into a first inner plenum and a second inner plenum, wherein the inlet orifice is fluidly connected to the first inner plenum.

In addition to one or more of the features described above, or as an alternative, further embodiments may include that the pre-diffuser includes a guide wall defining the pre-diffuser, and wherein the inlet extender proximate the distal end is shaped to be about perpendicular to the guide wall of the pre-diffuser.

In addition to one or more of the features described above, or as an alternative, further embodiments may include that the pre-diffuser includes a guide wall defining the pre-diffuser. An angle between the guide wall of the pre-diffuser and the inlet extender proximate the distal end is less than or equal to 90 degrees.

In addition to one or more of the features described above, or as an alternative, further embodiments may include that the pre-diffuser includes a guide wall defining the pre-diffuser. An angle between the guide wall of the pre-diffuser and the inlet extender proximate the distal end is less than 90 degrees.

In addition to one or more of the features described above, or as an alternative, further embodiments may include that the pre-diffuser includes a guide wall defining the pre-diffuser. An angle between the guide wall of the pre-diffuser and the inlet extender proximate the distal end is equal to 90 degrees.

In addition to one or more of the features described above, or as an alternative, further embodiments may include: an orifice located in the inlet extender fluidly connecting the first inner plenum and the second inner plenum; and a ramp located opposite the orifice.

In addition to one or more of the features described above, or as an alternative, further embodiments may include that the ramp extends away from a radially inward wall of the diffuser case and towards the orifice.

In addition to one or more of the features described above, or as an alternative, further embodiments may include that the ramp is orientated at an angle relative to a radially inward wall of the diffuser case, the angle being less than 90 degrees as measured between the radially inward wall and an aft side of the ramp.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
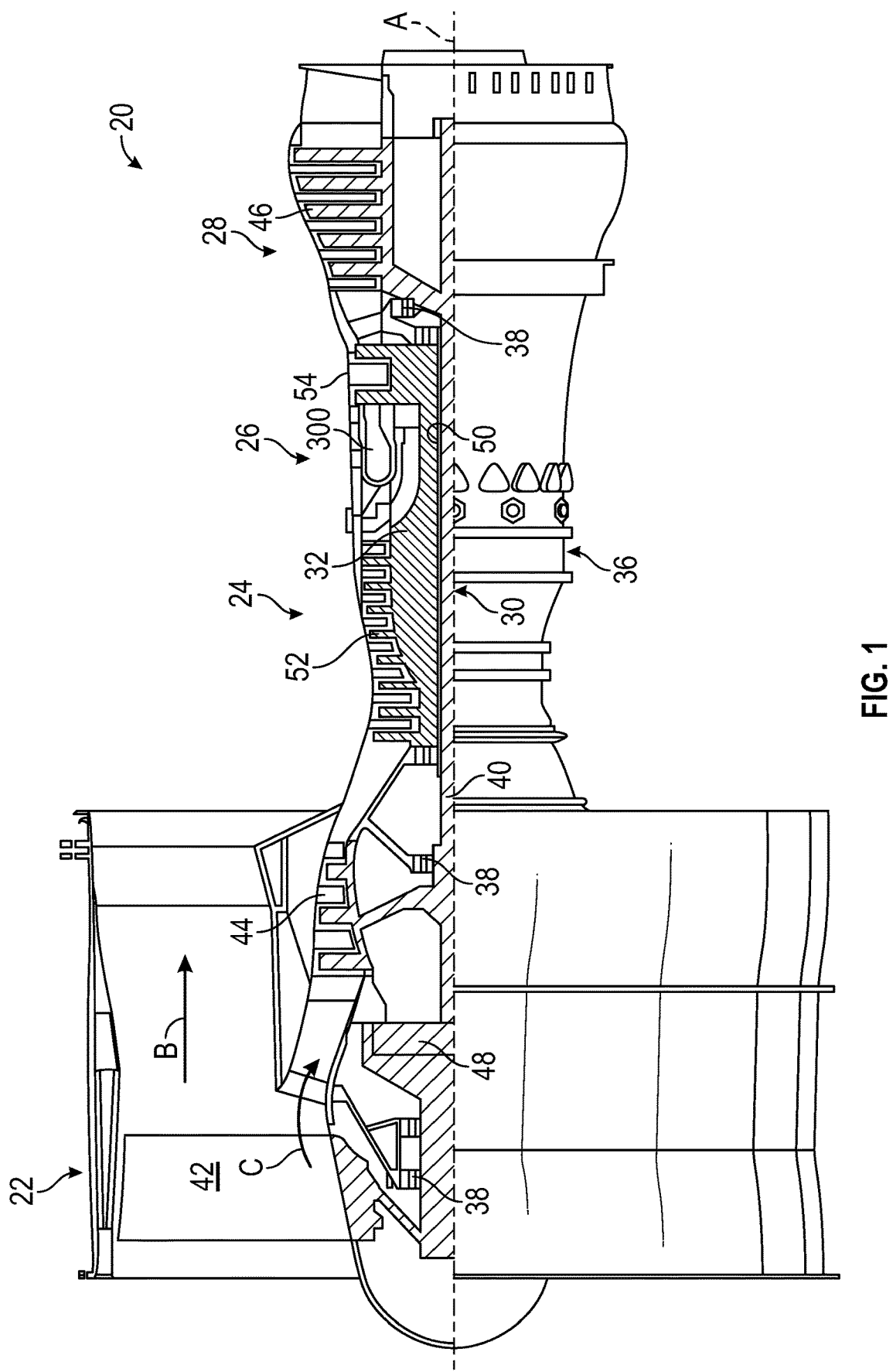
FIG. 1 is a partial cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°\text{R})/(518.7°\text{R})]^{0.5}$. The "Low corrected fan tip speed" as disclosed herein according to one non-limiting embodiment is less than about 1150 ft/second (350.5 m/sec).

Figure 2:
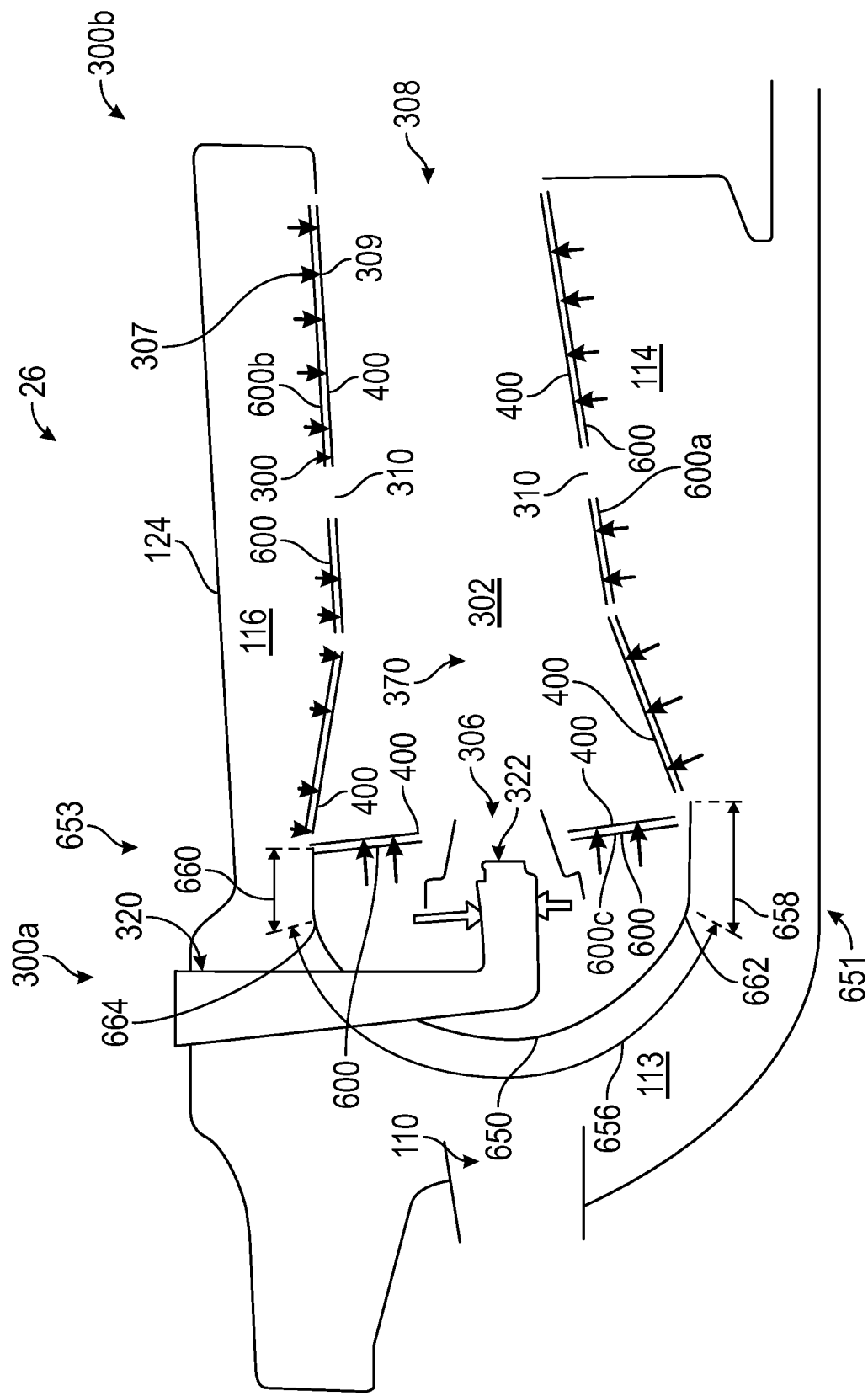
FIG. 2 is a cross-sectional illustration of a combustor.

Referring now to FIG. 2, with continued reference to FIG. 1, the combustor section 26 of the gas turbine engine 20 is shown. The combustor 300 of FIG. 2 is an impingement film float wall combustor. It is understood that while an impingement film float wall combustor is utilized for exemplary illustration, the embodiments disclosed herein may be applicable to other types of combustors for gas turbine engines including but not limited to double pass liner combustors, float wall combustors, and combustors with single wall liners.

As illustrated, a combustor 300 defines a combustion chamber 302. The combustion chamber 302 includes a combustion area 370 within the combustion chamber 302. The combustor 300 includes an inlet 306 and an outlet 308 through which air may pass. The air may be supplied to the combustor 300 by a pre-diffuser 110. Air may also enter the combustion chamber 302 through other holes in the combustor 300 including but not limited to quench holes 310, as seen in FIG. 2.

Compressor air is supplied from the compressor section 24 into a pre-diffuser 110, which then directs the airflow toward the combustor 300. The combustor 300 and the pre-diffuser 110 are separated by a dump region 113 from which the flow separates into an inner plenum 114 and an outer plenum 116. As air enters the dump region 113, a portion of the air may flow into the combustor inlet 306, a portion may flow into the inner plenum 114, and a portion may flow into the outer plenum 116.

Figure 3:
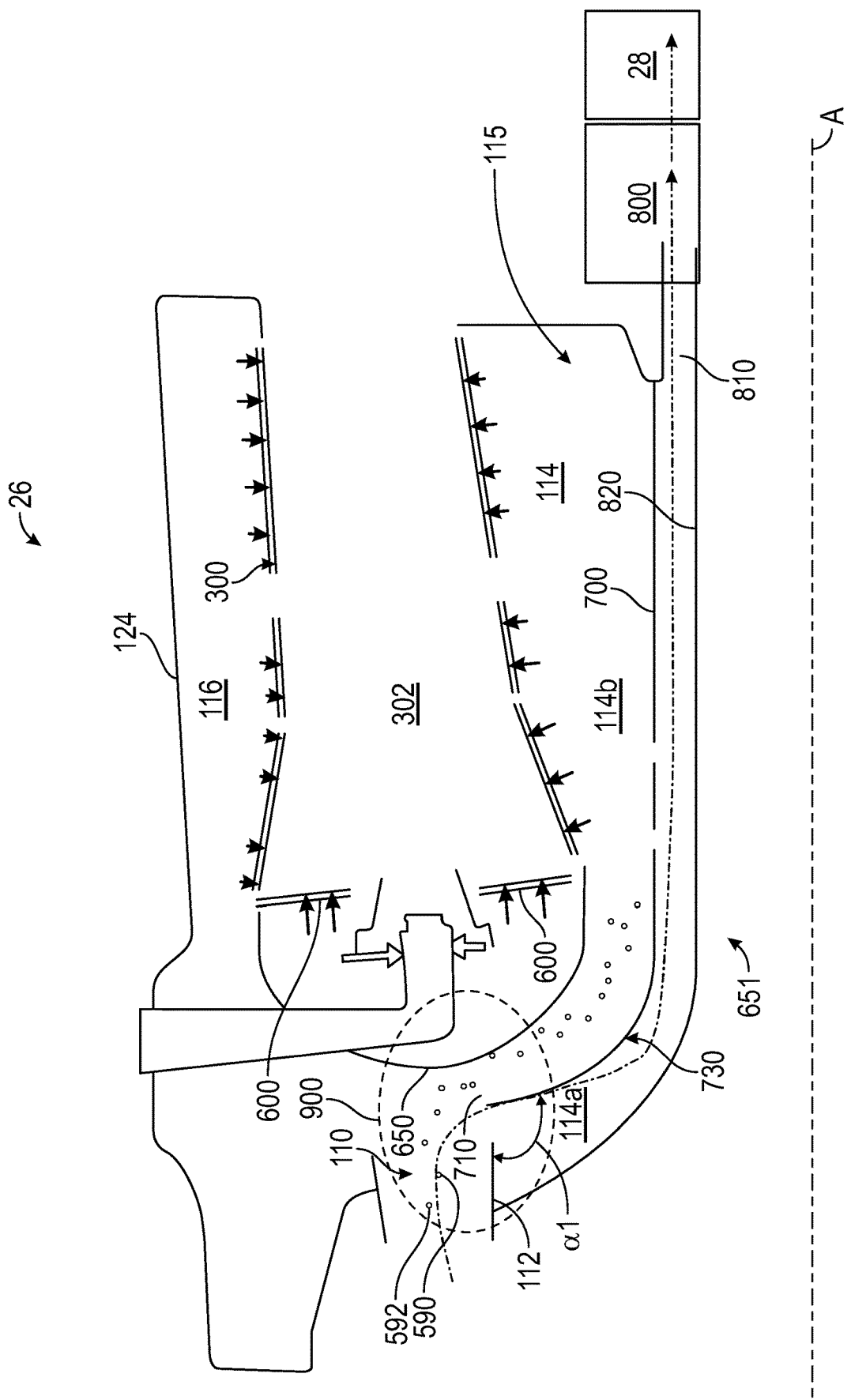
FIG. 3 is a cross-sectional illustration of a combustor having an inlet extender, in accordance with an embodiment of the present disclosure.

The air from the inner plenum 114 and the outer plenum 116 may then enter the combustion chamber 302 by means of one or more primary apertures 307 in the shell 600 and one or more secondary apertures 309, as shown in FIGS. 2 and 3. The primary apertures 307 and secondary apertures 309 may include nozzles, holes, etc. The air may then exit the combustion chamber 302 through the combustor outlet 308. At the same time, fuel may be injected into the combustion chamber 302 through the primary and/or secondary orifices of a fuel injector 320 and a pilot nozzle 322, which may be atomized and mixed with air, and then ignited and burned within the combustion chamber 302. The combustor 300 of the engine combustion section 26 may be housed within diffuser case 124 which may define the inner plenum 114 and the outer plenum 116. The combustor 300 is housed within the diffuser case 124 between the inner plenum 114 and the outer plenum 116.

The combustor 300, as shown in FIG. 2, includes multiple heat shield panels 400 that are attached to one or more shells 600. The heat shield panels 400 may be arranged parallel to the shell 600. The shell 600 includes a radially inward shell 600a and a radially outward shell 600b in a facing spaced relationship defining the combustion chamber 302 therebetween. The shell 600 also includes a forward shell 600c extending between the radially inward shell 600a and the radially outward shell 600b. The forward shell 600c further bounds the combustion chamber 302 on a forward end 300a of the combustor 300. The radially inward shell 600a and the radially outward shell 600b extend circumferentially around the longitudinal engine axis A. The radially inward shell 600a is located radially inward from the radially outward shell 600b.

The heat shield panels 400 can be removably mounted to the shell 600 by one or more attachment mechanisms 332. In some embodiments, the attachment mechanism 332 may be integrally formed with a respective heat shield panel 400, although other configurations are possible. In some embodiments, the attachment mechanism 332 may be a threaded mounting stud or other structure that may extend from the respective heat shield panel 400 through the interior surface to a receiving portion or aperture of the shell 600 such that the heat shield panel 400 may be attached to the shell 600 and held in place. The heat shield panels 400 partially enclose a combustion area 370 within the combustion chamber 302 of the combustor 300.

The combustor 300 also includes a forward dome 650 attached to the shell 600 at a forward end 300a of the combustor 300. The forward end 300a is located opposite an aft end 300b of the combustor 300, as illustrated in FIG. 2. The forward dome 650 includes a curved dome portion 656 that is operably shaped or curved to direct a portion of the airflow from the pre-diffuser 110 around the forward dome 650 and into the inner plenum 114 and the outer plenum 116. The forward dome 650 includes a radially inward linear portion 658 located on a radially inward side 651 of the forward dome 650 and a radially outward linear portion 660 located on a radially outward side 653 of the forward dome 650. The radially inward linear portion 658 is linear in shape. The radially outward linear portion 660 is linear in shape. The forward dome 650 transitions from the curved dome portion 656 to the radially inward linear portion 658 at a radially inward transition point 662, which may be a bend in the forward dome 650, as illustrated in FIG. 2. The forward dome 650 transitions from the curved dome portion 656 to the radially outward linear portion 660 at a radially outward transition point 664, which may be a bend in the forward dome 650, as illustrated in FIG. 2.

Referring now to FIGS. 3, 4A, 4B, and 4C, with continued reference to FIGS. 1-3, an inlet extender 700 extending from an inlet orifice 810 of a tangential onboard injector (TOBI) module 800 is illustrated, according to an embodiment of the present disclosure. The TOBI module 800 is configured to distribute cooling airflow 590 from the inner plenum 114 to the turbine section 28 of the gas turbine engine 20.

Blades of turbine section 28 of gas turbine engines 20, as well as other components of the turbine section 28, experience elevated heat levels during operation. Impingement and/or convective cooling of the turbine section 28 may be used to help cool components within the turbine section 28. Convective cooling may be achieved by airflow 590 that is channeled from the TOBI module 800 to the turbine section 28.

The cooling airflow 590 may contain particulates 592, which may build up on the components of the turbine section 28 overtime, thus reducing the cooling ability of the cooling airflow 590. Embodiments disclosed herein seek to address particulate adherence to components within the turbine section 28 in order to maintain the cooling ability of the cooling airflow 590 by reducing particulate 592 entry into the TOBI module 800. Particulate 592 may include but is not limited to dirt, smoke, soot, volcanic ash, or similar airborne particulate known to one of skill in the art.

As illustrated in FIG. 3, the inlet orifice 810 of the TOBI module 800 is located proximate an aft end 115 of the inner plenum 114. The inlet orifice 810 may be an opening or orifice in the diffuser case 124 that fluidly connects the inner plenum 114 to the TOBI module 800.

Figure 4A:
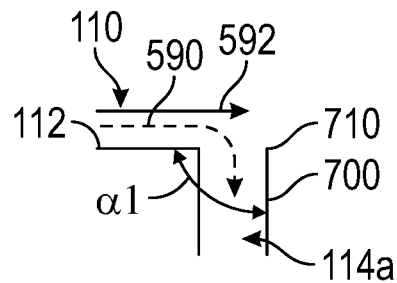
FIG. 4A is an enlarged illustration of a distal end of the inlet extender, in accordance with an embodiment of the present disclosure.
Figure 4B:
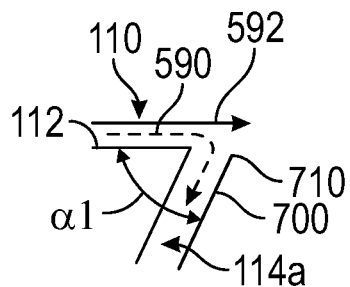
FIG. 4B is an enlarged illustration of a distal end of the inlet extender, in accordance with an embodiment of the present disclosure.
Figure 4C:
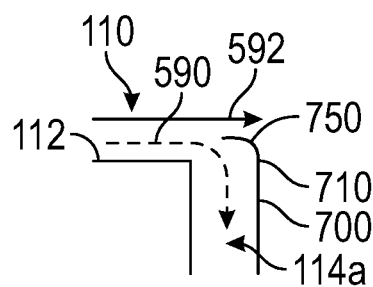
FIG. 4C is an enlarged illustration of a distal end of the inlet extender, in accordance with an embodiment of the present disclosure.

The inlet extender 700 is interposed between the combustor 300 and the radially inward wall 820 of the diffuser case 124. The inlet extender 700 initiates at the inlet orifice 810 of the TOBI module 800, extends through the inner plenum 114, and terminates at a distal end 710 proximate the pre-diffuser 110. As illustrated in FIG. 3, the inlet extender 700 may separate the inner plenum 114 into a first inner plenum 114a and a second inner plenum 114b. In one embodiment, the inlet extender 700 may fluidly separate the inner plenum 114 into the first inner plenum 114a and the second inner plenum 114b. The inlet orifice 810 is fluidly connected to the first inner plenum 114a. The first inner plenum 114a is located proximate a radially inward wall 820 of the diffuser case 124 and radially inward of the second inner plenum 114b. The second inner plenum 114b is located proximate the combustor 300 and radially outward of the first inner plenum 114a. The inlet extender 700 may be substantially shaped to follow a curvature of the radially inward wall 820 of the diffuser case 124. The inlet extender 700 proximate the distal end 710 may be shaped to be about perpendicular to a guide wall 112 of the pre-diffuser 110. The guide wall 112 defines the pre-diffuser 110. In an embodiment, an angle α1 between the guide wall 112 of the pre-diffuser 110 and the inlet extender 700 proximate the distal end 710 may be less than or equal to 90 degrees. As illustrated in FIG. 4A, the angle α1 between the guide wall 112 of the pre-diffuser 110 and the inlet extender 700 proximate the distal end 710 may be about equal to 90 degrees. As illustrated in FIG. 4B, the angle α1 between the guide wall 112 of the pre-diffuser 110 and the inlet extender 700 proximate the distal end 710 may be less than 90 degrees. In an embodiment, the inlet extender 700 may also include a catcher 750 extending radially outward from the distal end 710, as illustrated in FIG. 4C. The inlet extenders 700 shown in FIGS. 4A, 4B, and 4B each benefit from centrifugal filtering caused by centrifugal forces generated by the compressor section 24, which forces particulate 592 radially outward and away from the inlet of the inlet extend 700 proximate the distal end 710. In comparison, the inlet extenders 700 shown in FIGS. 4A and 4B require a sharper turn than the inlet extender 700 shown in FIG. 4C, thus leading to relatively better filtration of particulate 592 by the inlet extender 700 shown in FIG. 4C but an associated pressure loss comes with the better filtration. The inlet extender 700 shown in FIG. 4C has a lower pressure loss experienced by the inlet extenders shown in FIGS. 4A and 4B but relies on the centrifugal forces generated by the compressor section 24 for the majority of particulate 592 filtering and not sharp turns.

In another embodiment, the curvature of a forward portion 730 of the inlet extender 700 proximate the distal end 710 may follow a curvature of the forward dome 650, such that the forward dome 650 and the inlet extender 700 are in a facing spaced relationship. Advantageously, by located the distal end 710 of the inlet extender 700 proximate the pre-diffuser 110, the inlet orifice 810 of the TOBI module 800 is essentially moved forward or extended relative to the previous location in the aft end 115 of the inner plenum 114. The distal end 710 of the inlet extender 700 is located in a high velocity region 900 of airflow 590 flow in the dump region 113. Airflow 590 is at a higher velocity as the airflow 590 exits the pre-diffuser 110 and moves through the dump region 113 then the airflow proximate an aft end 115 of the inward plenum 114.

The distal end 710 of the inlet extender 700 is configured to force the airflow 590 in the high velocity region 900 to make a hard turn at a distal end 710 of the inlet extender 700. The airflow 590 is able to make the turn around the distal end 710 of the inlet extender 700, however particulate 592 being carried along with the airflow 590 is typically not able to make this hard turn and centrifugal forces cause the particulate 592 to separate from the airflow 590. Thus, the airflow 590 will continue into the first inner plenum 114a, while the particulate 592 moves through to the second inner plenum 114b.

Figure 5:
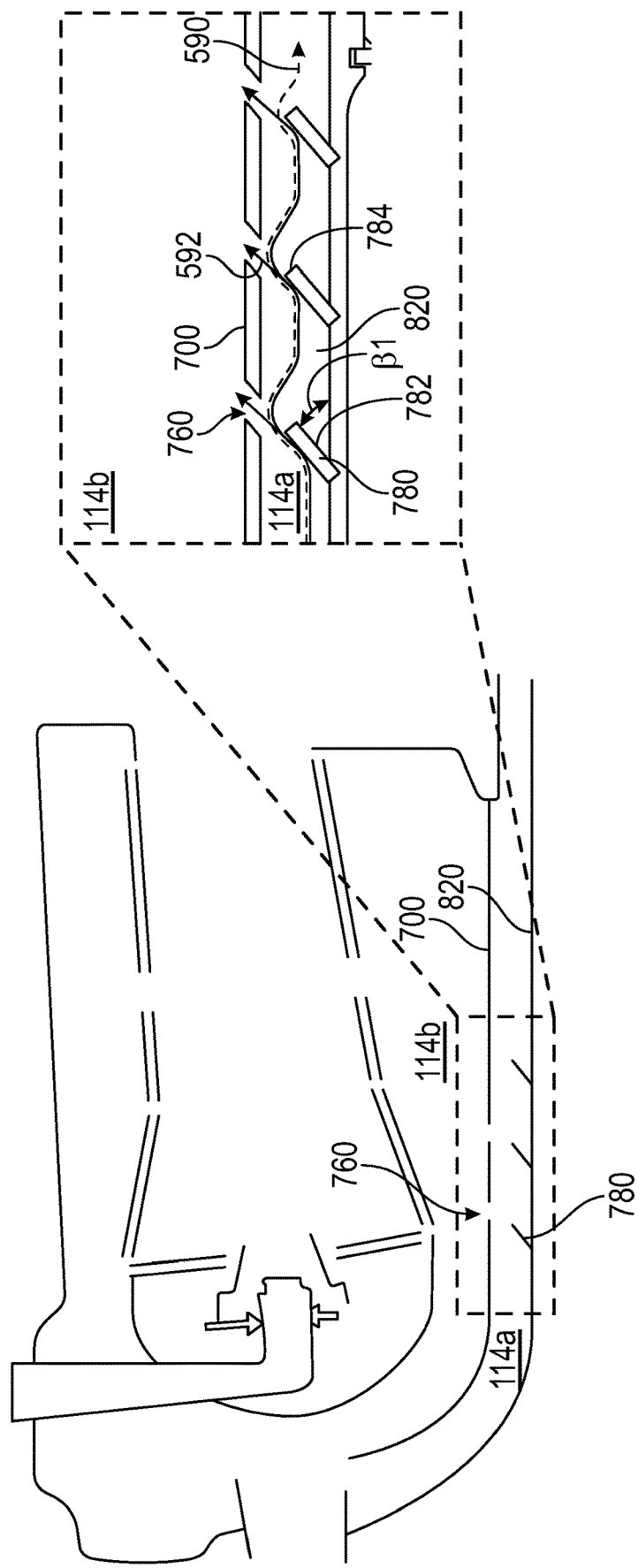
FIG. 5 is an illustration of the inlet extender of FIG. 3 with orifices, in accordance with an embodiment of the present disclosure.

Referring now to FIG. 5, with continued reference to FIGS. 1-4, an inlet extender 700 that includes one or more orifices 760 is illustrated, in accordance with an embodiment of the present disclosure. The orifice 760 fluidly connect the first inner plenum 114a and the second inner plenum 114b. A ramp 780 is located in the first inner plenum 114a opposite the orifice 760. The ramp 780 may extend away from the radially inward wall 820 of the diffuser case 124 toward the orifice 760 as illustrated in FIG. 5. The ramp 780 may be oriented at an angle β1 that is less than 90 degrees relative to radially inward wall 820 as measured between the radially inward wall 820 and an aft side 782 of the ramp 780. The ramp 780 extends to a distal end 784 proximate the orifice 760.

The ramp 780 is oriented at the angle β1 to direct particulate 592 out of the first inner plenum 114a through the orifice 760 and into the second inner plenum 114b, thus preventing the particulate 592 from entering the TOBI module 800 and subsequently the turbine section 28.

The distal end 784 of the ramp 780 is configured to force the airflow 590 to make a hard turn at the distal end 784 of the ramp 780. The airflow 590 is able to make the turn around the distal end 784 of the ramp 780, however particulate 592 being carried along with the airflow 590 are typically not able to make this hard turn and centrifugal forces cause the particulate 592 to separate from the airflow 590 at the distal end 784 of the ramp 780 where they are directed through the orifices. Thus, the airflow 590 will continue through the first inner plenum 114a, while the particulate 592 moves to the second inner plenum 114b. As illustrated in FIG. 5, multiple ramp 780 and orifice 760 pairs may be arranged in series to provide multiple points for ejection of particulate 592.

Technical effects of embodiments of the present disclosure include attaching an inlet extender onto an inlet of a TOBI module to extend the inlet to a high velocity zone of airflow within the diffuser case, where particulate centrifugal separation can occur prior to airflow entering the inlet extender.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A diffuser case for a gas turbine engine, comprising:
a pre-diffuser;
the diffuser case defining a dump region downstream of the pre-diffuser, an inner plenum, and an outer plenum, the pre-diffuser being fluidly connected to the inner plenum and the outer plenum through the dump region;
a tangential onboard injector module fluidly connected to the inner plenum through an inlet orifice located in the diffuser case proximate an aft end of the inner plenum;
an inlet extender initiating at the inlet orifice of the tangential onboard injector module, the inlet extender extending through the inner plenum, and terminates at a distal end proximate the pre-diffuser, the distal end being a free end; and
wherein the distal end of the inlet extender is located in the dump region between an aft end of the pre-diffuser and a forward end of a forward dome of a combustor of the gas turbine engine, the inlet extender fluidly separates the inner plenum into a first inner plenum and a second inner plenum, each having an inlet opening proximate to the distal end of the inlet extender and the second inner plenum being radially outward of the first inner plenum, wherein the inlet orifice is fluidly connected to the first inner plenum.

2. The diffuser case of claim 1, further comprising
a radially inward wall at least partially defining the inner plenum, wherein the inlet extender is located proximate the radially inward wall.

3. The diffuser case of claim 1, wherein the pre-diffuser includes a guide wall defining the pre-diffuser, and wherein the inlet extender proximate the distal end is shaped to be perpendicular to the guide wall of the pre-diffuser.

4. The diffuser case of claim 1, wherein the pre-diffuser includes a guide wall defining the pre-diffuser, and wherein an angle between the guide wall of the pre-diffuser and the inlet extender proximate the distal end is less than or equal to 90 degrees.

5. The diffuser case of claim 1, wherein the pre-diffuser includes a guide wall defining the pre-diffuser, and wherein an angle between the guide wall of the pre-diffuser and the inlet extender proximate the distal end is less than 90 degrees.

6. The diffuser case of claim 1, wherein the pre-diffuser includes a guide wall defining the pre-diffuser, and wherein an angle between the guide wall of the pre-diffuser and the inlet extender proximate the distal end is equal to 90 degrees.

7. The diffuser case of claim 1, further comprising:
an orifice located in the inlet extender fluidly connecting the first inner plenum and the second inner plenum; and
a ramp located opposite the orifice.

8. The diffuser case of claim 7, further comprising
a radially inward wall at least partially defining the inner plenum, wherein the inlet extender is located proximate the radially inward wall,
wherein the ramp extends away from the radially inward wall and towards the orifice.

9. The diffuser case of claim 7, further comprising
a radially inward wall at least partially defining the inner plenum, wherein the inlet extender is located proximate the radially inward wall,
wherein the ramp is orientated at an angle relative to the radially inward wall, the angle being less than 90 degrees as measured between the radially inward wall and an aft side of the ramp.

10. A gas turbine engine, comprising:
a pre-diffuser;
a diffuser case defining a dump region downstream of the pre-diffuser, an inner plenum, and an outer plenum, the pre-diffuser being fluidly connected to the inner plenum and the outer plenum through the dump region;
a combustor housed within the diffuser case between the inner plenum and the outer plenum;
a tangential onboard injector module fluidly connected to the inner plenum through an inlet orifice located in the diffuser case proximate an aft end of the inner plenum; and
an inlet extender initiating at the inlet orifice of the tangential onboard injector module, the inlet extender extending through the inner plenum, and terminates at a distal end proximate the pre-diffuser, the distal end being a free end; and
wherein the distal end of the inlet extender is located in the dump region between an aft end of the pre-diffuser and a forward end of a forward dome of the combustor, the inlet extender fluidly separates the inner plenum into a first inner plenum and a second inner plenum, each having an inlet opening proximate to the distal end of the inlet extender and the second inner plenum being radially outward of the first inner plenum, wherein the inlet orifice is fluidly connected to the first inner plenum.

11. The gas turbine engine of claim 10, wherein the inlet extender is interposed between the combustor and a radially inward wall of the diffuser case.

12. The gas turbine engine of claim 10, wherein the pre-diffuser includes a guide wall defining the pre-diffuser, and wherein the inlet extender proximate the distal end is shaped to be perpendicular to the guide wall of the pre-diffuser.

13. The gas turbine engine of claim 10, wherein the pre-diffuser includes a guide wall defining the pre-diffuser, and wherein an angle between the guide wall of the pre-diffuser and the inlet extender proximate the distal end is less than or equal to 90 degrees.

14. The gas turbine engine of claim 10, wherein the pre-diffuser includes a guide wall defining the pre-diffuser, and wherein an angle between the guide wall of the pre-diffuser and the inlet extender proximate the distal end is less than 90 degrees.

15. The gas turbine engine of claim 10, wherein the pre-diffuser includes a guide wall defining the pre-diffuser, and wherein an angle between the guide wall of the pre-diffuser and the inlet extender proximate the distal end is equal to 90 degrees.

16. The gas turbine engine of claim 10, further comprising:
   an orifice located in the inlet extender fluidly connecting the first inner plenum and the second inner plenum; and
   a ramp located opposite the orifice.

17. The gas turbine engine of claim 16, wherein the ramp extends away from a radially inward wall of the diffuser case and towards the orifice.

18. The gas turbine engine of claim 16, wherein the ramp is orientated at an angle relative to a radially inward wall of the diffuser case, the angle being less than 90 degrees as measured between the radially inward wall and an aft side of the ramp.

* * * * *